United States Patent
Glanz et al.

(10) Patent No.: US 9,276,255 B2
(45) Date of Patent: Mar. 1, 2016

(54) LITHIUM CELL HAVING AN IMPROVED CATHODE STRUCTURE AND PRODUCTION METHOD FOR IT

(75) Inventors: Leonore Glanz, Stuttgart (DE); Ulrich Eisele, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 919 days.

(21) Appl. No.: 13/514,281

(22) PCT Filed: Nov. 8, 2010

(86) PCT No.: PCT/EP2010/066963
§ 371 (c)(1),
(2), (4) Date: Nov. 13, 2012

(87) PCT Pub. No.: WO2011/076475
PCT Pub. Date: Jun. 30, 2011

(65) Prior Publication Data
US 2013/0136968 A1    May 30, 2013

(30) Foreign Application Priority Data

Feb. 5, 2010    (DE) .................... 10 2010 001 632

(51) Int. Cl.
*H01M 4/13*    (2010.01)
*H01M 4/139*    (2010.01)
(Continued)

(52) U.S. Cl.
CPC ............... *H01M 4/13* (2013.01); *H01M 4/139* (2013.01); *H01M 6/00* (2013.01); *H01M 10/052* (2013.01); *H01M 4/131* (2013.01); *H01M 4/1391* (2013.01); *H01M 10/0525* (2013.01);
(Continued)

(58) Field of Classification Search
CPC ....... H01M 4/13; H01M 4/139; H01M 4/131; H01M 4/1391; H01M 10/052; H01M 10/0525; H01M 6/00; H01M 2004/021; H01M 2004/028; Y10T 29/49108
See application file for complete search history.

(56) References Cited

U.S. PATENT DOCUMENTS 6,770,353 B1    8/2004   Mardilovich et al.
2005/0064291 A1*  3/2005  Sato et al. ...................... 429/233
(Continued)

FOREIGN PATENT DOCUMENTS

CN       101496199      7/2009
DE       102007030604   1/2009
(Continued)

OTHER PUBLICATIONS

Thackeray et al. (J Electrochem Soc 148 (1) A102-A104 (2001)).*
(Continued)

*Primary Examiner* — Ula C Ruddock
*Assistant Examiner* — Lisa S Park
(74) *Attorney, Agent, or Firm* — Kenton & Kenyon LLP

(57) ABSTRACT

A lithium cell is described having a cathode structure made of a base material which conducts electrons and Li ions. The cathode structure includes a continuous substrate, which provides a continuous base area, starting from which a plurality of crosspieces extends. The crosspieces provide crosspiece surfaces, starting from which carrier structures extend. The carrier structures provide carrier surfaces on which active material is distributed. In addition, an accumulator is also described in which a plurality of lithium cells is stacked. A method for producing a lithium cell is also described.

10 Claims, 3 Drawing Sheets

(51) Int. Cl.
*H01M 10/052* (2010.01)
*H01M 6/00* (2006.01)
*H01M 4/131* (2010.01)
*H01M 4/1391* (2010.01)
*H01M 10/0525* (2010.01)
*H01M 4/02* (2006.01)

(52) U.S. Cl.
CPC .. *H01M 2004/021* (2013.01); *H01M 2004/028* (2013.01); *Y02E 60/122* (2013.01); *Y10T 29/49108* (2015.01)

(56) References Cited

U.S. PATENT DOCUMENTS

2009/0214944 A1* 8/2009 Rojeski .................. 429/142
2010/0203383 A1 8/2010 Weppner

FOREIGN PATENT DOCUMENTS

| | | |
|---|---|---|
| DE | 102010001632 | 6/2011 |
| EP | 1662592 | 5/2006 |
| EP | 1926164 | 5/2008 |
| JP | 2005-116248 | 4/2005 |
| JP | 2005-293850 | 10/2005 |
| JP | 2007-273249 | 10/2007 |
| JP | 2008-243736 | 10/2008 |
| JP | 2009-181877 | 8/2009 |
| JP | 2009-266492 | 11/2009 |
| JP | 2010-524166 | 7/2010 |
| WO | WO 2006050022 | 5/2006 |
| WO | WO 2008120162 | 10/2008 |

OTHER PUBLICATIONS

International Search Report, PCT International Application No. PCT/EP2010/066963, dated Feb. 2, 2011.

* cited by examiner

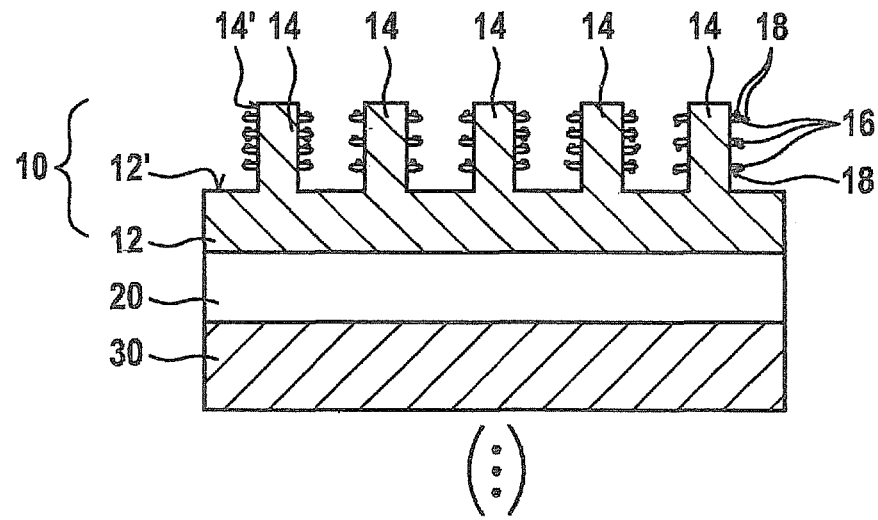
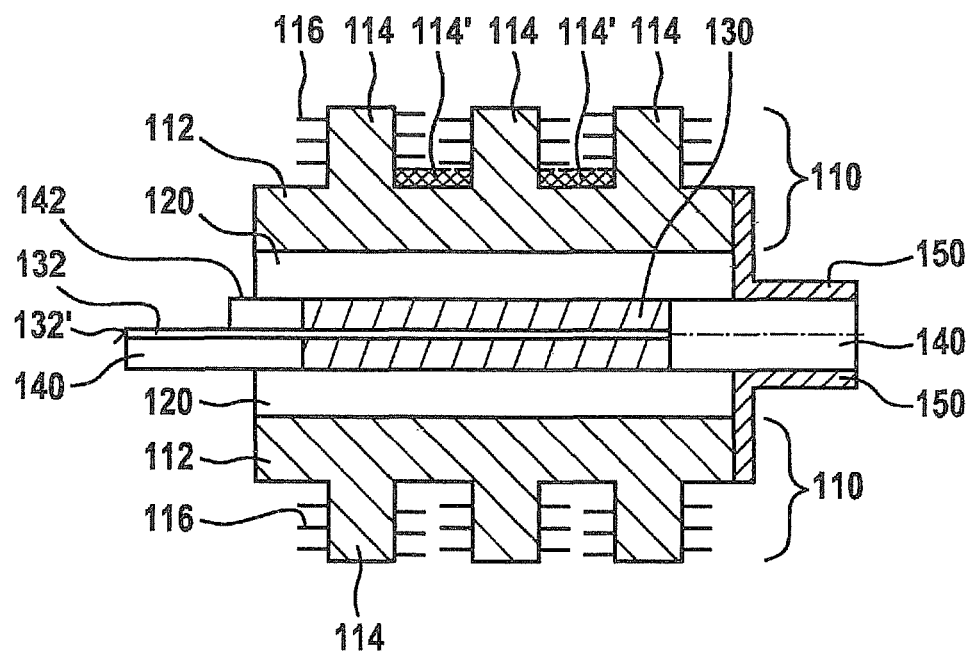

LITHIUM CELL HAVING AN IMPROVED CATHODE STRUCTURE AND PRODUCTION METHOD FOR IT

FIELD OF THE INVENTION

The present invention relates to the technical field of electrical accumulators, such as are used particularly, having high power density and high energy density, for electrically operated vehicles, such as hybrid vehicles or electric vehicles. The present invention particularly relates to a lithium cell, in which the cathode structure provides an especially high cycle resistance and mechanical stability by a suitable arrangement of the active material on a base material according to the present invention.

BACKGROUND INFORMATION

Li ion batteries are used in numerous applications, particularly mobile communications, entertainment electronics or as traction batteries for electrically driven vehicles. Especially Li ion batteries have a high energy storage capacity, at approximately 100 Wh/kg. For high energy applications, for instance, as a traction energy store for electrically operated vehicles, Li ion batteries, in spite of their high energy storage capacity, are connected with heavy devices. To achieve a range of typically 400 km, for example, the battery weight would have to amount to ca. 600 kg.

For this reason, lithium-sulfur batteries are already being produced in laboratory quantities, which promise to have an energy density of 600 Wh/kg and more.

However, conventional lithium/sulfur systems have a low cycle resistance because of the great structural changes during examination discharging of such systems. In particular, the rearrangement and the coarsening of grains of granular carbon/sulfur composite based on the phase transformation/new formation of the sulfur component conductors to a great loss of storage capacity and energy release-capacity.

Furthermore, in conventional systems, corrosion of the lithium metal anode occurs, based on the reaction with the electrolyte, the solvent and the polysulfides. However, a graphite intercalation anode is linked to an additionally reduced cell voltage, which is already relatively low in any case.

In addition, no production method has as yet been provided by which stable and high-performance lithium-based accumulators can be produced cost-effectively and in a simple manner.

SUMMARY

It is an object of the present invention to provide an improved lithium-based cell, which in particular has a greater cycle resistance at high electrical efficiency, and which may be easily produced.

The example lithium cell according to the present invention makes possible a particularly great power density at a high cycle resistance at the same time and a high energy density. The example device according to the present invention is able to be produced cost-effectively and energy-efficiently, and the corresponding production method is based on simple production processes, which may be carried out using widespread tools. In particular, the properties, especially the structural properties of the lithium cell, may be predetermined exactly by precisely controlled operating parameters of the production tools. According to first estimates, using the example lithium cell according to the present invention, energy densities of approximately 600 Wh/kg may be achieved. In particular, the lithium cell is able to be produced using continuous layer methods, so that large piece numbers are able to be achieved using simple means.

The lithium cell according to the present invention has a cathode structure made of a base material that conducts both electrons and Li ions. The base material may also be provided of a base structure equivalent to this, made of a material that does not conduct Li ions, which conducts electricity, the base material structure including a liquid electrolyte which is provided between the material that does not conduct Li ions and that conducts Li ions. The electrically conductive material, in this instance, may be a metal, an alloy or another electrically conductive material, which may be freeze cast and sintered in particulate form.

The stable cathode structure, which enables a high specific surface, is provided by a continuous substrate which forms a base area. Starting from this base area of the substrate, a multitude of crosspieces extends, preferably generally perpendicular to the base area, or rather at the places at which the crosspieces meet the substrate. Using these crosspieces, the space above the substrate is first fanned, especially in a direction perpendicular to the base area. The crosspieces themselves provide crosspiece surfaces which are preferably essentially parallel to one another, the crosspieces being developed in a lamella shape and which extend continuously in a direction parallel to the base area. In addition, the space above the base area is fanned in an additional direction by having carrier structures extend starting from the crosspiece surfaces, in order to pass through the space between the crosspiece surfaces using the carrier structures. Because of these carrier structures, the space is fanned in an additional direction. Accordingly, there results a number of planes in a direction parallel to the base area because of the multitude of crosspieces and their crosspiece surfaces and further multitude of planes by the carrier structures in a direction perpendicular to the base area, since the carrier structures extend away from the crosspiece surfaces. In particular, the carrier structures extend generally perpendicular from the crosspiece surfaces. With that, the carrier structures penetrate the space above the base area in several dimensions, so that the carrier surfaces provide a very large specific surface. On the carrier surfaces, an active material is distributed, or rather situated, to act as a reactive or catalytic material.

Since the cathode structure, i.e., the base material layer, the crosspieces and the carrier structures are provided to be made of electrically conductive base material, the cathode structure according to the present invention permits an electrode line as well as a Li-ion line from the finely distributed carrier surfaces to the continuous base material layer, the crosspieces and the carrier structures providing an optimal spatial fanning of the carrier surfaces, so that the active material is able to be distributed having an optimal specific surface, and at the same time is connected to the continuous base material layer conducting ions and electrons. Because of the subdivision of the space over the base area by the crosspieces in a first direction and by the carrier structures which extend from the crosspieces, in a different direction, stable cathode structures may specifically be produced which have a very high space penetration. The two-part quality (crosspieces/carrier structures) also make possible a precise adjustment of the desired properties during the production process, particularly since two different successive production processes for the carrier structures and for the crosspieces are able to be provided. The control of the overall structural properties is also made easier in that first the crosspieces, and subsequently carrier structures are produced in two separate processes, which, independently of each other, define the structural properties of the crosspieces and the structural properties of the carrier structures.

The crosspieces and the carrier structures situated on them are preferably each produced by deposition processes, which still make possible a continuous material between the carrier structures and the crosspieces and between the crosspieces and the base material layer. The continuous material connection between the base area, the crosspieces and the carrier structures enables a simple electron line and ion line from the active material to the continuous base material layer. In particular, the crosspieces extend perpendicular to the base area of the base material layer, the carrier structures which, in turn, extend perpendicular from the crosspieces and from the crosspiece surfaces, extending generally in the same direction, along which the base area extends as well. However, since the carrier structures are preferably provided in smaller structures than the crosspieces, it is sufficient if the carrier structures are only approximately perpendicular to the crosspiece surfaces, and preferably extend in an angular amount range of ±70°, ±45° or ±30° from the crosspieces. The crosspieces, in turn, are preferably parallel to one another. The alignment angles of the crosspieces may also scatter. The crosspieces may, on the one hand, be provided to be essentially perpendicular to the base material layer, but they may also extend at an angle to the base material layer, for instance, at an angular amount range of ±45° or ±30° of the normal to the base area. However, while the angular alignment of the crosspieces and of the carrier structures may move over wide ranges, the crosspieces are preferably all essentially parallel to one another, whereby automatically the distribution of the specific surface within the lithium cell is homogeneous.

The same applies to the distribution of the carrier structures. The carrier structures of adjacent crosspieces are situated opposite to one another, but are not connected directly to one another, in order to permit a narrow interspace between the end faces of the carrier structures of adjacent crosspieces. Depending on the field of application, this interspace may be used for supplying or carrying off reaction products, or for the removal of reaction products or also, to make possible an improved distribution of the specific surface and a homogeneous distribution of the specific surface and a homogeneous distribution of the active material.

The base material layer is also used for conducting electrons and includes an electrical contact, which provides the cathode connection of the lithium cell. Since the base material layer is connected to all crosspieces, and is furthermore conductive for electrons, this electrical contact can only be provided at an edge region of the base material layer. In particular, the electrical contact may be mounted directly on an end face of the continuous base material layer, to which the base area extends essentially perpendicularly. In this way, the cathode connection may be mounted as generally the last production step of the lithium cell.

One additional specific embodiment provides that a conductor element be provided between adjacent crosspieces, in order to improve the electrical conductivity of the cathode structure and to support the conductivity of the base material. In particular, between adjacent crosspieces a metal strip may be provided which has a higher specific conductivity than the electrically conductive base material, in order to improve the current conductivity. The metal strips may be printed onto the base surface. In one corresponding example production method, it is provided that the metal strips be first printed onto the base surface, and in a subsequent step, the crosspieces and the carrier structures be provided. The metal strips may be provided made from any material desired, especially of metal, (in particular of copper or aluminum), of an alloy or of another electrically conductive material which will not be impaired by a sintering process or its temperatures. In this way, the electrically conductive and the ion-conductive base material, a so-called mixed conductor material, may also have a slightly lesser electrical conductivity, the electrical connecting elements between the crosspieces, however, improving the current conductivity. The electrical connecting elements between the crosspieces may be directly connected to the electrical contact that provides the cathode connection. In general, at least a part of the cathode connection of the lithium cell is provided as a continuous strip, which extends at a rim or an edge of the lithium cell or the base material layer.

According to one preferred specific embodiment of the lithium cell, the crosspieces and the substrate are developed as freeze-cast structures of the base material. Particularly suitable for this are the structures and the production methods which are described in a German Patent Application of this Applicant having the internal reference number R.330646.

The carrier structures, that extend away from the crosspiece surfaces, are preferably microstructures or nanostructures produced by deposition, especially nanowires which are made up of the base material. The carrier structures are preferably structures synthesized hydrothermally or through the gas phase, which grow on the crosspiece surfaces. If not occupied by the crosspieces, the carrier structures are also provided on the base area. The carrier structures may be made particularly of fibers, bent many times, which form a textile, particularly a fleece structure or a felt structure, or other undirected thread structures. By contrast, for example, to the multiply intertwined microstructure of the carrier structures, the crosspieces preferably extend in planes that are parallel to one another. The continuous substrate also preferably extends along a plane. Finally, the carrier structures may include not only nanowires, but also nanotubes.

The material of the carrier structures and the crosspieces is one that conducts Li-ions and electrons, in the form of a mixed conductor material. The base material has an electrode potential with respect to lithium of at most 2.9 V or at most 2 V. Suitable, in particular, is Li—Ti oxide or $Li_{4-x}Mg_xTi_5O_{12}$, where $0 \leq x \leq 2$ or $0 \leq x \leq 1$, or $Li_{4-x}Mg_xTi_{5-y}(Nb, Ta)_yO_{12}$, where $0 \leq x \leq 2$ or $0 \leq x \leq 1$ and $0 \leq y \leq 0.1$ or $0 \leq y \leq 0.05$. Alternatively, $Li_{2-x}Mg_xTi_{3-y}(Nb, Ta)_yO_7$ where $0 \leq x \leq 1$ or $0 < x < 0.5$ and $0 < y < 0.03$ may be used. The active material may be sulfur or sulfur particles. Furthermore, the catalyst material that is designed to support Li—O reactions may be used as an active material, especially $\alpha$-$MnO_2$ or nanocrystalline $\alpha$-MnO.

The example lithium cell according to the present invention also preferably includes a solid electrolyte structure made of an electrically insulating, Li-ion conducting material. This solid electrolyte structure forms the sublayer of the substrate, so that the substrate is situated directly on the solid electrolyte structure. The base area, from which the crosspieces extend, is on the opposite side of the substrate surface, which is situated directly on the solid electrolyte structure. By the use of the continuous solid electrolyte structure, the electrically conductive and ion-conductive base material is separated from additional sublayers, whereby, in particular, an electrical short circuit is avoided, but an Li-ion transport is made possible at the same time. As the material for the solid electrolyte structure, gastight and watertight material are suitable. Garnet ceramics are suitable, for instance, $Li_7La_3Zr_2O_{12}$ ceramics of the Li—SiCON type, for example, $Li_{1+x+y}Al_x(Ti, Ge)_{2-x}Si_yP_{3-y}O_{12}$ where $0 \leq x \leq 1$ and $0 \leq y \leq 1$. The Li-ion-conducting solid electrolyte materials may be used, as described in German Patent Application No. DE 102007030604 or in European Patent No. EP 1926164.

Moreover, the lithium cell includes an anode structure, on which the solid electrolyte structure is situated. The anode structure includes elementary lithium and is separated from the electrically conductive cathode structure by the solid electrolyte structure. An additional electrical contact is preferably provided on the anode structure, which provides the anode connection of the lithium cell. This electrical contact, which provides the anode connection of the lithium cell, may in particular be connected electrically to the anode structure at one of its end faces. The anode structure is electrically separated from the active material first by the solid electrolyte structure, and, because of the cathode structure, may be separated spatially from the latter. Thus, the following layer sequence comes about: Anode structure (having elementary lithium)—solid electrolyte structure (Li-ion-conductive, electrically insulating)—cathode structure (electron conducting/Li-ion conducting)—active material (sulfur or catalyst material for supporting lithium-oxygen reactions).

Since the anode structure represents an outside point of this structure sequence or layer sequence, the structural sequence may be repeatedly mirrored with respect to each other on both sides of the anode structure. Thus the anode structure particularly includes two sides, on which, in each case, first the solid electrolyte structure according to the present invention is situated, on which, in turn, in each case the cathode structure is located, as was described above. Consequently, both sides of the anode structure are used, whereby the production process is provided to be more efficient, and a greater specific surface of an accumulator comes about, which is made up of a multiplicity of lithium cells according to the present invention.

In the simplest case, the anode structure may be a continuous plate or layer of elemental lithium. Preferably, however, the electron line in the anode structure is supported by a layer having high specific conductivity, for instance, made of copper or aluminum, generally of a metal or of an alloy. The copper layer may extend within the anode structure, so that the copper layer divides the anode structure into two parts, between which the copper layer is situated. Alternatively, or in combination with this, a conducting layer may be provided on a surface of the anode structure, that is, between the solid electrolyte structure and the anode structure, this layer not being continuous, but being penetrated by gaps filled with lithium, so that Li ions are able to wander into the solid electrolyte structure. In the case of a conducting layer between the solid electrolyte structure and the anode structure, this is preferably lattice-shaped, for instance, in the form of a printed structure of metal cladding, or the like. The conducting layer is provided made of a material that has a higher specific conductivity than lithium, particularly of a metal or an alloy made of aluminum or copper, for example. The electrically conducting layer within the anode structure or between the anode structure and the solid electrolyte structure may also be provided by a sintered layer of electrically conducting material (generally a metal or alloys, particularly aluminum or copper). The electrically conducting layer is continuously conductive, but is pierced by gaps especially filled up with lithium if the electrically conducting layer is provided between the solid electrolyte structure and the anode structure.

One further specific embodiment provides that the anode structure is interspersed by a solid foam, such as a metal foam or a foam made of an alloy, that is interspersed by lithium metal. For one thing, the solid foam enables an electrical conductivity, and for another, the direct contact of lithium with the solid electrolyte structure, so that Li ions are able to wander through the solid electrolyte structure. Furthermore, the anode may be mounted directly on the solid electrolyte structure by using adhesives, preferably using a plastic frame or a polymer frame which holds the components of the lithium cell. The adhesive preferably conducts electrons and lithium ions, and may particularly include additives that support the electric line and a Li ion line.

The substrate conducts both electrons and Li ions, and with respect to lithium, preferably has an electrode potential of at most 2.9 V or at most 2 V. As the substrate, particularly Li—Ti oxides are suitable, a part of the lithium being able to be replaced by magnesium, and a part of the titanium by niobium or tantalum, or both.

As the active material, sulfur is particularly suitable in the form of particles, if the lithium cell is embodied as a lithium-sulfur cell. In the case of lithium-oxygen cells, the active material is catalyst material, which supports the electrochemical reactions of lithium and oxygen, particularly á-$MnO_2$. The catalyst material is preferably present in nanocrystalline form or as particles or powder, and is distributed on the carrier surfaces.

The solid electrolyte structure is provided made of a material that conducts Li ions and is electrically insulating. As the material, glass ceramics, lithium-based phosphate glass or other solid electrolytes are especially suitable. As the material for the solid electrolyte structure, particularly a lithium-sulfate-phosphorus-sulfate glass ceramic is suitable, especially $(n)Li_2S.(1-n)P_2S_5$ where n=50 . . . 90, 60 . . . 80, 65 . . . 75 or ca. 70.

As the material for the electrical contacts that form the cathode connection and the anode connection, particularly metals or alloys are suitable, especially aluminum or copper, which are processed as strips.

Moreover, the present invention is provided by a lithium accumulator which includes multiple lithium cells according to the present invention. The lithium accumulator also includes a mounting support in which a plurality of lithium cells according to the present invention is situated in the form of a stack. The mounting support not only provides mechanical fastening, but also includes electrical contacts, in order to connect the lithium cells to one another electrically. One particularly simple specific embodiment provides that the electrical contacts of the mounting support preferably include plug contacts, so that the electrical contacts of the lithium cell, that is, the cathode connection and the anode connection, are able to be connected by a plug connection to the electrical contacts of the mounting support, so that the lithium cells are plugged into the mounting support, and are thereby connected both mechanically and electrically. The lithium cells are preferably furnished with layer-shaped electrodes, which provide the cathode connection and the anode connection. Such a cathode connection extends, for example, in an edge region of the solid electrolyte structure on a surface of the solid electrolyte structure, in this edge region the solid electrolyte structure not carrying a cathode structure. In particular, the cathode connection juts directly against a cathode structure adjacent to the edge section, and is in direct connection to a frontal area or end face of the cathode structure. Other specific embodiments provide that the cathode connection is situated on a frame element, within which the anode structure extends, the frame structure not being conductive, so that the cathode connection connects electrically only an outer surface or an end face of the cathode structure. The cathode connection preferably extends as a strip to an edge section of the lithium cell, the cathode connection also extending as a strip to an edge section of the lithium cell, but on the opposite side of the lithium cell. If the anode structure includes an intermediate conducting layer, which separates a two-part lithium layer, the latter is able to extend beyond the anode structure all the way through a frame element, and exit at an edge section of the frame structure from the latter, for instance, through a recess at an edge of the frame structure. The anode structure thus exposed extends in the form of a strip parallel to the extension plane of the lithium cell (to which the cathode connection also extends in parallel), the cathode connection and the anode connection being situated, however, on opposite sides or, in general, on different sides of the lithium cell. Because of this, it is particularly simple to provide a cell stack by plug connections.

Alternatively to a lithium accumulator, whose mounting support connects all the lithium cells to one another, a mounting support may also be provided which has only a contact for each lithium cell, that is, however, individual for each lithium cell, and contacts of different lithium cells are not connected to one another. Furthermore, because of the stack arrangement, a series connection or a parallel connection may be implemented in a simple manner, in that either contacts are used that run through on each side within the mounting support (parallel connection) or in that alternatingly interrupted contacts are used, and the cells are situated antiparallel (i.e., alternatingly anode connecting elements and cathode connection on one side) in the mounting support. More detailed specific embodiments of lithium accumulators, according to the present invention, are shown in the figures.

In accordance with the present invention, an example method is provided for producing a lithium cell, the cathode connection being provided by freeze casting a base material, as described above, which is also used for implementing the cathode structure of the lithium cells according to the present invention, a continuous substrate being produced by the freeze casting which produces a plurality of crosspieces extending from the base area of the substrate. The continuous substrate and the crosspieces are preferably produced in the same freezing step, alternatively, however, a continuous substrate may first be provided, onto which the crosspieces may be applied as a continuous material, using freeze casting. The present invention also provides that, after the production of the crosspieces the carrier structures be provided by depositing the base material in the form of microstructures or nanostructures, preferably as nanowires, a particularly large specific surface being achieved thereby. After carrier structures are situated on the crosspieces, active material is situated on the carrier surfaces, which are provided by the carrier structures. The materials used and the structures correspond to the materials and the structures which are shown above with the aid of the example lithium cell according to the present invention or with the aid of the abovementioned lithium accumulator.

The example method particularly provides that a solid electrolyte structure is provided in such a way as is defined above, with the aid of the lithium cell. The solid electrolyte structure is used as the basis for the design of the cathode structure, so that first the solid electrolyte structure is provided, onto which the substrate and the crosspieces are applied. A direct contact between the substrate and the solid electrolyte structure is regarded as a direct application, and also a connection using an adhesive layer that conducts Li ions.

The cathode structure is applied onto the solid electrolyte structure by freeze casting. In this instance, the solid electrolyte structure is used as the casting form or casting support.

The anode structure shown above with the aid of the lithium cell or with the aid of the lithium accumulator described above, may be provided in various ways. First of all, an electrode layer may be provided that is situated between two lithium layers, whereupon the lithium layers are pressed together or connected in a different manner to the intermediate electrode layer, whereby the electrode layer provides a current conductivity. The electrode layer may also be provided with a contact that is used as the anode contact. A metal foam layer is used alternatively, which is interspersed with lithium, the metal (aluminum or copper) being foamed, preferably together with lithium or lithium particles, so that the lithium is distributed within the metal during the foaming, and in response to the solidifying of the metal foam layer, the desired lithium distribution comes about. Furthermore, an anode contact may be applied to the metal foam after the metal foam layer has been produced.

The two procedures described above for producing the anode structure both assume that the anode is first provided separately from the solid electrolyte structure, whereupon the solid electrolyte structure is preferably situated on both sides of the anode layer. This arrangement may be carried out by adhering the anode layer to the solid electrolyte structure (preferably using an adhesive material). The fastening of the solid electrolyte structure(s) to the electrode layer may also go along with arranging a frame, the anode structure being situated in the frame, and then the frame, the anode structure are adhered together with the solid electrolyte structure. The arranging and adhering of the frame may go along with the application of electrical contacts to the anode structure. In addition, a cathode contact to the cathode structure, which is located on the solid electrolyte structure, may be produced together with the arranging of the frame. The outer edge of the frame forms a holding structure in this instance, on which an electrical cathode contact is situated. The solid electrolyte structures are preferably provided with a cathode structure already mounted on them, especially in which there is already located active material, before the solid electrolyte structure is fastened to the anode layer.

Furthermore, two solid electrolyte structures (preferably already provided with a cathode structure and active material) may be arranged, with respect to each other, so as to span an interspace between them, into which lithium is applied, the applied lithium forming the anode structure. Alternatively, the solid electrolyte structures may first be arranged with respect to each other without cathode structures, then the lithium may be introduced into the interspace, whereupon the cathode structures are applied onto the respective solid electrolyte structures. The lithium may be inserted into the interspace between two solid electrolyte structures by electrochemical pumping of lithium into the interspace or by casting the lithium into the interspace. The solid electrolyte structures are preferably first held together by a frame structure in whose inside the interspace extends. After the solid electrolyte structures have been fastened using the plastic frame, lithium is inserted into the interspace, particularly by casting the lithium into a lateral opening in the frame, which is then closed. In order to protect the cathode structures from stresses, which come about from the application of the lithium into the interspace, the cathode structures are preferably produced, or applied onto the solid electrolyte structures, after the introduction of the lithium into the interspace.

A ceramic frame or a plastic frame may be used as the frame. When a ceramic frame is used, the solid electrolyte structure/cathode structure may be connected to the frame, solder glass or plastic solder or adhesives being used for the fastening. When solder glass is used, the sintering process may be carried out before or after arranging the solid electrolyte structure/cathode structure in the frame. In particular, when solder glass is used, during the sintering process of the solid electrolyte structure/cathode structure, the frame is able to be connected to it, especially if the solder glass has a glass transition temperature that is (slightly) below the temperature of the sintering process. Moreover, the crosspieces are preferably sintered together with the carrier structure, especially when they are made of the same material and developed as one part.

When a plastic frame is used, after the sintering of the cathode structure, the former is connected to the latter, preferably using adhesives or plastic solder.

The present invention may also be implemented by an example method for producing a lithium accumulator, in which the example method according to the present invention for producing the lithium cells, according to the present invention, is carried out. In this instance, the lithium cells are provided with electrical contacts, especially at the side edge of the substrate. The contacts include a cathode electrode, or an electrical contact for the cathode, as well as an electrical contact for the anode. Different sides of the substrate are usually used for the anode and for the cathode, particularly opposite sides. It is particularly preferred if the cathode contacts and the anode contacts are situated on a plastic frame, which is already fastened to the solid electrolyte structure. The lithium cells are plugged into a mounting support of the accumulator in the form of stacks, according to the present invention, whereby electrical contacts of the mounting support are electrically connected to the anode contacts and the cathode contacts. The electrical connection provided also includes a mechanical connection, preferably using a spring contact, which may, for instance, be provided by the mounting support of the accumulator. Because of that, the lithium cells may be stacked by being plugged in, in a simple manner, the mechanical connections, by using spring contacts, also providing a stable mechanical arrangement of the lithium cells of the stack.

The solid electrolyte structure as well as the substrate and the crosspieces of the cathode structure may be applied one on top of another by sequential coating methods. Particularly suitable are strip casting methods, coating methods (in which particularly the substrate and the crosspieces are applied onto the prefabricated, hardened solid electrolyte structure), or printing techniques. In this case, the solid electrolyte structure is provided as a planar layer, as also the continuous substrate is provided as a planar layer, which extends in parallel to the solid electrolyte structure, on it. The solid electrolyte structure and the substrate, or rather the crosspieces extending on it, may be arranged in a moldable condition one on top of the other, whereupon cathode structure and solid electrolyte structure are produced by a drying process and/or by an in-common calcining process. In this connection, the solid electrolyte structure may first be provided, onto which the substrate is applied, or the substrate may be provided first, onto which the solid electrolyte structure is applied. In the latter case, the crosspieces are produced after the provision of the substrate. These described methods include in particular that the solid electrolyte structure and/or the substrate are arranged as precursor materials with respect to each other (or are individually provided), whereupon, using a drying process or a calcining process, the final, dry substrate, the crosspieces and/or the solid electrolyte structure are provided.

Electrically nonconductive material is used for the frame. Instead of a plastic frame, a ceramic frame may also be used, which is preferably conductive neither for Li ions nor for electrons, by providing the ceramic frame first, and the substrate, the crosspieces and the solid electrolyte structure are positioned in it, or the ceramic frame may be shaped as precursor material together with the solid electrolyte structure and the substrate (preferably also as precursor material), whereupon an in-common calcining process produces the base material, the ceramic material of the frame and the final solid electrolyte structure. The frame and the solid electrolyte structure are able to be connected to each other by the sintering process, in which the crosspieces are also sintered. The ceramic materials have a sintering temperature which corresponds to the calcining temperature of the base material and the solid electrolyte structure, for instance, in that mixtures of $ZrO_2$/glass or $Al_2O_3$/glass are used. Compared to a plastic frame, this has the advantage that a single, in-common calcining process (co-firing) as the sintering step of the precursors of the substrate, perhaps also of the crosspieces, the solid electrolyte structure and of the frame, produces a major part of the lithium cell according to the present invention. The active material, particularly sulfur, is provided preferably after the calcining process, this possibly also applying for the carrier structures, since these are stressed by their fine structure, possibly by the calcining process. Furthermore, the elemental lithium of the anode is situated in the example structure according to the present invention, after the sintering.

BRIEF DESCRIPTION OF THE DRAWINGS

FIG. 1 shows the basic structure of an example lithium cell according to the present invention.

FIG. 2a shows a specific embodiment of the example lithium cell according to the present invention, in a sectional view.

DETAILED DESCRIPTION OF EXAMPLE EMBODIMENTS

Figure 2B:
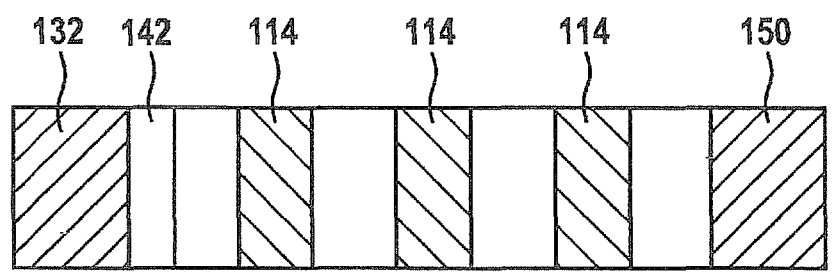
FIG. 2b shows the lithium cell shown in FIG. 2a, in a top view.

FIG. 1 shows an example lithium cell according to the present invention, in cross section. FIG. 1 is used for showing some main features of the lithium cell, with the aid of a basic structure. The lithium cell of FIG. 1 includes a cathode structure 10 having a substrate 12 and a plurality of crosspieces 14. Cathode structure 10 also includes carrier structures 16, which are shown only symbolically and are provided in particular by nanowires. On carrier structures 16, active material 18 is located. The active material is shown only symbolically and is situated in the form of fine particles on the entire surface of carrier structures 16. Crosspieces 14 include crosspiece surfaces 14', starting from which carrier structures 16 extend, crosspieces 14 themselves extending away from a base area 12', which is formed by a surface of the continuous substrate 12. On the side, opposite the crosspieces, of continuous substrate 12, a solid electrolyte structure 20 is located. An anode structure 30, which includes lithium, follows after solid electrolyte structure 20, on the side of the solid electrolyte structure which is opposite to the substrate. Anode structure 30, solid electrolyte structure 20 and continuous substrate 12 are provided in planar layers that are parallel to one another. Anode structure 30 provides Li ions, which are able to get to cathode structure 10 through solid electrolyte structure 20, and vice versa. Solid electrolyte structure 20 is also an electrical insulator.

By contrast to this, cathode structure 10, especially continuous substrate 12, crosspieces 14 and carrier structures 16 are made of material that conducts Li ions and is also electrically conductive. Solid electrolyte structure 20 separates anode structure 30 electrically from cathode structure 10, but it enables an ion transport for discharging and charging the cell. The cell shown in FIG. 1 has only a one-sided cathode structure, starting from the anode structure, however, on the side of the anode structure, that faces away from the electrolyte structure shown, an additional solid electrolyte structure, and then an additional cathode structure may adjoin, so that a mirrored arrangement with reference to anode structure 30 comes about.

FIG. 2a shows a symbolic illustration of a design on both sides. The cell of FIG. 2a includes an anode structure 130, in which an electrode layer 132 extends, for supporting the conductivity. Electrode structure 132 is separated from solid electrolyte structure 120 by lithium of the anode structure. A cathode structure 110 is adjacent respectively to solid electrolyte structures 120 on both sides, which includes a continuous layer 112, crosspieces 114 and carrier structures 116. The active material provided on carrier structures 116 is not shown in FIG. 2a, for the sake of illustration. The two opposing solid electrolyte structures 120 (and with that, also the opposing cathode structures 110) are separated from each other not only by anode structure 130 but also by frame structure 140.

In the embodiment of FIG. 2a, frame structure 140 is made in two parts, in order for one thing, to carry electrode structure 132 of anode 130, and for another thing, to carry an electrode structure 150 of the cathode. Both electrode structure 132 of the anode and electrode structure 150 of the cathode are provided to be of a conductive material, particularly of a metal or an alloy, particularly of copper but also aluminum. Electrode structure 150 extends, for one thing, to a surface of frame 140, and for another to an end face of cathode structure 110, in order to contact the latter electrically. Electrodes 132 and 150 each form sections which extend along the extension surface of the lithium cell, so that simple contacting is possible. In order to hold electrode structure 132 of the anode, frame 140 is made in two parts, one part being assigned to the upper cathode structure, solid electrolyte structure and an additional part to the lower cathode structure/solid electrolyte structure. Because of this, electrode structure 132 of the anode may, in a simple manner, be inserted between the two frame parts, or rather, this makes it possible for the electrode structure to extend in a straight manner and project forth from the two-part lithium-anode structure. During the production, the anode structure is situated after the sintering process of the crosspieces and the substrate (during which a ceramic frame is able to be connected to the solid electrolyte).

In order to make possible access to the surface of electrode structure 132 of the anode perpendicular to the anode structure, a part of the frame is provided having a narrower edge than the other part of the frame, at least at the side at which electrode structure 132 of the anode is brought out. Alternative specific embodiments, which are not shown here, provide a frame that is symmetrical to electrode structure 132 of the anode, a contacting at the end face of electrode structure 132 being provided. An exemplary contacting location at the end face is shown in FIG. 2a having reference numeral 132'.

The embodiment of FIG. 2a also includes exemplary electrical bridgings 114', which are provided in the form of conductor elements or metal strips between the crosspieces of cathode structure 110, and which are made of material having a high conductivity, for instance, of copper or of aluminum. These support the electrical connection between crosspieces 114, and thus increase the conductivity that is provided by the base material of the cathode structure. The electrical bridgings may particularly be provided by metal strips, which are provided on the sections of the base area of the substrate that lie between crosspieces 114. Metal strips 114' are only optional, and are therefore shown by broken lines. The support of the conductivity of the base material may be required, since it is true that the base material is a mixed conductor, that is, it conducts ions and also electrons, but perhaps it does not have the high specific conductivity of copper, for example, or another metal. Metal strips 114' are preferably connected to electrode structure 150, for instance, using a circuit board conductor structure on the substrate.

FIG. 2b shows the lithium cell shown in FIG. 2a, in a top view. One may see that crosspieces 114 extend parallel to one another, first a narrow edge section 142 protruding from the cell, that is also shown in FIG. 2a. The surface of electrode structure 132 adjoins the anode. On the opposite side, electrode structure 150 adjoins the cathode, which are both provided as conducting areas, for instance, areas made of a metal layer or an alloy layer made of copper, for example, or of aluminum, particularly of a copper coating.

Figure 3:
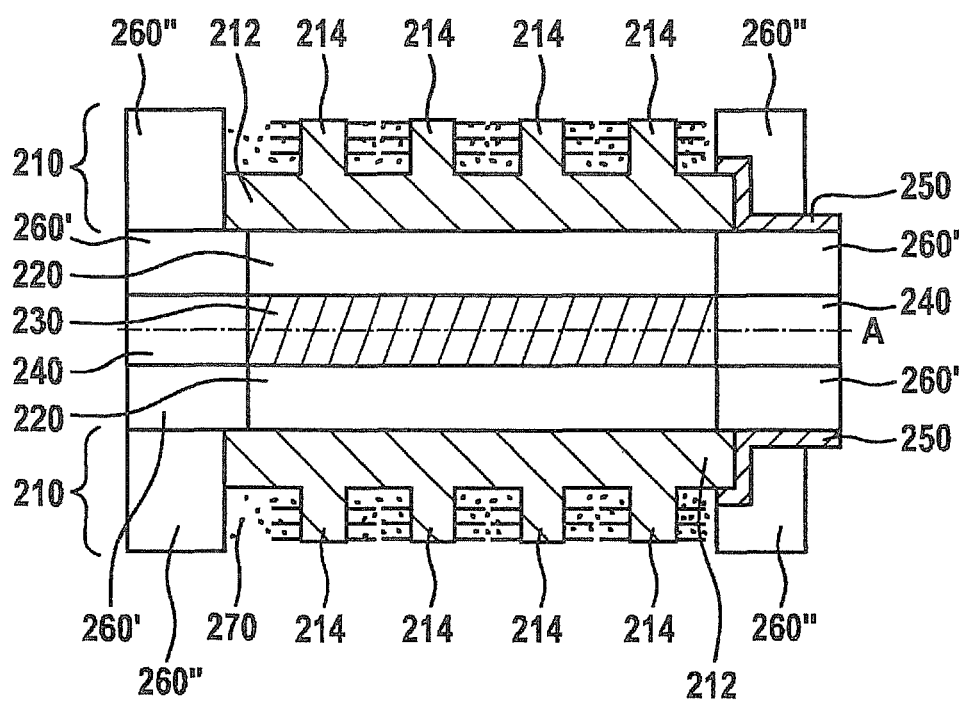
FIG. 3 shows a double-sided embodiment of the lithium cell according to the present invention, in cross section.

FIG. 3 shows an additional specific embodiment of the present invention, which is also used for the explanation of the example method according to the present invention. The lithium cell of FIG. 3 includes two mirror image cathode structures 210, which each include a continuous layer 212 as well as crosspieces 214, which extend outwards from substrate 212. Cathode structures 210 are each provided on a solid electrolyte structure 220, which, in turn, is provided on an anode structure 230. At the side of anode structure 230 a frame 240 is provided, within which the anode structure is located. On frame 240, a further frame structure 260 is situated, which is located on one side of the lithium cell in which no cathode contacting is provided. Frame 260 extends laterally from the solid electrolyte structure as well as laterally from cathode structure 210, and protrudes beyond it in a direction perpendicular to the plane of extension of the lithium cell. On one side of the lithium cell there is a cathode contacting 250, which extends on one part of frame 260', frame 260' being provided laterally only from the solid electrolyte structure, but not laterally from cathode structure 210. Cathode contacting 250 extends on frame 260' as well as laterally from continuous substrate 212 and (optionally) also partially on an edge section of the base area. On cathode contacting 250, a further frame element 260" is situated, which extends laterally from the cathode structure and beyond it, and stops at the same height as the opposite frame structure 260. Frame element 260" does not extend completely on the surface of cathode contacting 250, but an outer edge remains of cathode contacting 250, whose surface is able to be contacted from the outside without a problem.

For the production of the embodiment shown in FIG. 3, solid electrolyte structure 220 is first provided on a carrier band (not shown), which is removed later within the scope of the production. Then a frame 260 is arranged on the carrier band, within which the solid electrolyte structure is located. The solid electrolyte structure and frame element 260 end at the same height. Furthermore, the substrate, the crosspieces and the carrier structures are situated on solid electrolyte structure 220, for instance, by freeze casting. The frame (preferably made of ceramic) may also be situated on the solid electrolyte after the production of the crosspieces and the substrate, the frame, however, being able to be connected to the solid electrolyte ahead of time, before the crosspieces and the substrate are situated and produced. Next comes the arrangement of cathode contacts 250, for instance, by applying a metallization.

Frame 260" is situated laterally about the cathode structure and projects beyond the cathode structure. The carrier band is then removed, so that the lower side of the substrate becomes exposed. After the removal of the carrier band, there is the sintering step, to fasten the formed parts developed by freeze casting. The sintering step preferably follows directly the step of freeze casting. After the sintering, anode structure 230 is provided. Next, frame 260, which extends all the way around the anode structure, is fastened on the lower side of frame 260' (by adhesion, for example). Next comes the situation of the anode structure within frame 260', two alternative methods being possible for this.

According to a first method, the anode structure is provided by a two-part lithium layer, between whose parts a metal layer extends (particularly copper). The metal layer projects laterally from out of the two-part lithium layer. An outer edge is formed thereby, which becomes connected via a first part of a two-part frame 240 to frame 260' of the lithium cell. An additional system of the cathode structure, inclusive of the solid electrolyte structure and appertaining frame parts is provided, as described above, and is situated in the same manner on the opposite side of the anode structure. The electrode layer made of copper, which lies between the two lithium layers, takes its course along plane A. Since the electrode layer of the anode structure extends laterally from that, frame elements 240 are provided to have a thickness which, together with the thickness of the electrode layer, corresponds to the thickness of the anode layer. That being the case, frame 240, for one thing, ends together with the area of the anode structure that borders on respective solid electrolyte structure 220, and for another thing, because of a decreased thickness (compared to the thickness of the anode structure) there remains a height section in which the electrode of the anode is able to extend all the way through the frame, in order thus to provide an electrode end face at the side surface of frame 240, which makes possible contacting from the outside. Moreover, frame sections 260 give a mechanical lateral support to cathode structure 210, especially also for contacting 250 of the cathode.

One further possibility is first of all to provide solid electrolyte structure 220, frames 260', 260", the cathode structure and contacting 250 of the cathode as described above. Starting from two already equipped solid electrolyte structures (i.e. which already carry the cathode structure and frames 260', 260"), these are fitted together with the respective lower sides of the solid electrolyte structure (i.e. the sides opposite the cathode structure) via a spacer, which is used as a frame element. This frame element may be fastened using solder glass, for example. An interspace is formed by frame elements 260 and the lower sides of the solid electrolyte structure, into which lithium material is introduced. Frame 240, for example, has a lateral opening, through which lithium may be supplied. Alternatively, lithium may also be fitted in by electromechanical pumping, in which case, however, at least the active material is not provided on the carrier structures and possibly also the carrier structures are not yet provided on the crosspieces. After the filling (for instance, by filling in liquid lithium) the opening is closed. If frame 260 (made of ceramic) is fastened using solder glass, then, using a calcining process, frame 240, which encompasses the anode structure, may be connected to the respective solid electrolyte 220 by at least partial melting of the solder glass. After that, the lithium is introduced by electrochemical pumping or by pouring it into the interspace between the two solid electrolyte structures 220.

Both methods include the step of introducing active material 270 into the cathode structure, particularly onto the carrier structures of crosspieces 214, and also onto sections of the base area on which no crosspiece is developed.

In the case of all the FIGS. 1-4, neither the shapes nor the size relationships are shown to scale. The crosspieces, in particular, are clearly finer than shown, provided at a distance from each other of a few micrometers, for example, and have generally a constant thickness. Additional implementations provide that the crosspieces taper down toward the base area in their cross section, but it is also possible to have crosspieces that taper down away from the base area. In addition, the carrier structures are shown only symbolically, the alignment of the carrier structures relative to the crosspieces and to one another is in no way only purely parallel, but may be provided with any desired curvatures, especially if felt or fleece is involved.

Figure 4:
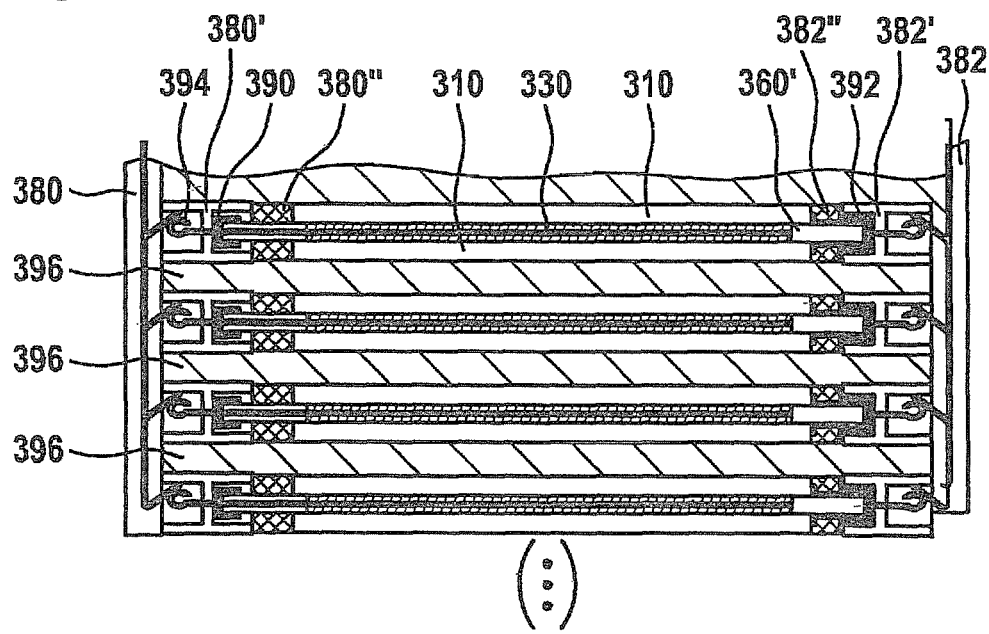
FIG. 4 shows an embodiment of an example lithium accumulator, according to the present invention, having a plurality of cells according to the present invention.

FIG. 4 shows an accumulator according to the present invention in cross section, which includes a plurality of lithium cells. The accumulator includes a mounting support having an anode conductor 380 and a cathode conductor 382 as well as mounting support elements 380', 380", 382', 382", by which mechanical and electrical contacts to the individual cells are provided. The individual cells are developed bilaterally having cathode structure 310 and an intermediate anode structure 330. Within the anode structure an electrode is provided which divides the anode structure into two parts. The mounting support includes electrical contacts 390, 392, using which, cathode contacts and anode contacts of the individual cells are contacted.

On the anode side, first a mechanical mounting support 380" holds a frame section, which extends laterally from the cell, and all the way through which a part of the electrode of the anode extends. The frame section ends in a side surface of the cell, at which an electrical contact 390 of the mounting support is located. The latter, in turn, is held in an additional mounting support element 380', or is held by the latter through a through hole, so as to provide an outside contacting 394. Outside contacting 394 is connected to a contact section of the anode conductor 380 via a spring connection or a plug connection, which presses on contact element 394 in a springy manner. That is why all the anode connections are connected to the anode discharge. On the cathode side a first mounting support element 382" is provided, which holds an edge section of a frame 360'. The edge section includes a cathode contacting, which is provided on the edge section which, in turn, is connected to electrical contacting 392 of the mounting support via a springy plug contact. Electrical contacting 392 is a part of holding element 382', which also has a through hole, so as to provide an electrical connection to cathode conductor 382. Thereby the individual cells are able to be plugged into mechanical and electrical contact elements 380", 390, 392, 382". In addition, the cathode conductors and the anode conductor are able to be taken off the mounting support elements, so that they are able to be plugged on from the outside, in a simple manner. Because of that, for example, anode conductors and cathode conductors 380, 382 which provide the type of interconnection configuration, are able to be exchanged.

While in FIG. 4 the anode conductor and the cathode conductor are designed for the parallel connection of the cells, the latter may also be discontinuous and connect only two pairs of contacts to one another, so as to provide a series connection. In this instance, the cells are alternatingly situated antiparallel to one another, whereby a series connection comes about in the usual manner.

While the contacting on the cathode side is provided by element 392, using a spring suspension, which presses particularly on the edge sections, on which the cathode contacting of the cell is located, electrical contact 390 is used to exert a spring force on an end face of the frame, in order to contact the end face of the electrode of the anode structure. Consequently, contact element 392 exerts a force which runs perpendicular to the plane of extension of the anode structure, whereas contacting 390 generates a spring force in the direction of extension of the lithium cell. Contacting 390 is particularly adjusted to the type of the anode implementation. When, for instance, outer surfaces of the edge of the frame also have electrically conducting surfaces that are connected to the anode structure, electrical contact element 390 may be provided with a spring force which presses perpendicular to the direction of extension of the cell. Besides the spring connections of mounting support and the cells, a springy plug connection between the outer contacts of mounting support 394 and the anode conductor and cathode conductor may be provided as well, particularly by having the electrical contact 394 provided using a springy material, especially one made of steel sheet metal. Alternatively or in combination with this, the anode and cathode conductors may include spring elements which also exert a spring force on contact elements 394 of the mounting support.

Between the individual cells, a separating layer 396 is provided, which is developed using electrically nonconductive material. The separating layer, which may be developed as a separating plate, is also preferably provided to be elastic or plastic, particularly in order to absorb forces and to stabilize the accumulator internally. Furthermore, the separating plate may have a substance which issues forth at higher temperatures and acts in a fire-inhibiting manner. The thickness of the separating layer is not shown to scale with respect to the thickness of the cells, but rather, the separating layer may be clearly thinner than the cells.

Figure 5A:
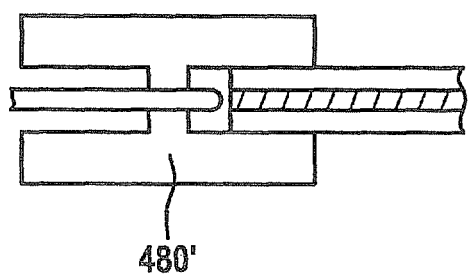
FIGS. 5a-c show alternatives to the embodiment of electrical contacts for a lithium accumulator according to the present invention.

FIG. 5a, in a detailed representation, shows an additional alternative specific embodiment of an anode contacting of the mounting support of the lithium accumulator according to the present invention. The latter includes a mounting support element 480' having a first recess into which an edge of a frame of a cell may be plugged, the edge of the frame including an intermediate electrode structure. Mounting support element 480' also includes an opposite additional recess, which makes possible a contacting using an anode conductor. The two recesses are connected by a through hole, through which a metal pin extends, and when the lithium cell is plugged in, the metal pin abutting directly onto the intermediate electrode structure of the frame section.

Figure 5B:
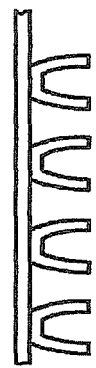

FIG. 5b shows a cathode rail which may be used in the cathode conductor. Along one direction of extension of the main rail, individual springy contact elements having a U shape are drawn up in a row, and they are open perpendicular to the direction of extension of the main rail. Into these, one is able to plug the outer frame sections of the cells, whereby there comes about a contact between the cathode rail and the electrically conductive surface that is applied to the edge region of the frame and is electrically connected to the cathode structure. A cathode rail of FIG. 5b may be plugged directly onto the cells without additional mounting support elements, as are shown in FIG. 4, using reference numerals 382' and 382". This yields a more compact structure.

Figure 5C:

FIG. 5c shows an embodiment of an anode rail by which the anodes of the cells are able to be contacted electrically. The anode rail includes an anode main rail, away from which spring elements extent in the shape of a W. These include a middle element between two outer spring sides, by which the end face of the anode may be contacted. As in the case of the cathode rail of FIG. 5b, the anode rail of FIG. 5c enables a direct contacting of the lithium cells and their mechanical arrangement, so that one may do without additional fastening elements that are shown in FIG. 4 using reference numerals 380', 380". The result is a more compact specific embodiment.

One further possibility provides that, in the case of a double-sided lithium cell, the individual electrodes, that are used for contacting the respective cathode, are connected to one another via an outer metal clamp. If there is such a cell together with the metal clamp in the mounting support, a metal pin, for example, may be applied all the way through a mounting support of the element, which abuts a side surface of the clamp, and thus contacts the two cathode contactings to each other. This clamp is provided, for instance, by a metallic clamping rail, which, in turn, is carried by a nonconductive mounting support rail, through which contact pins extend to the side surface of the clamping rail.

In general, plug connections are particularly preferred, above all in the form of contact rails into which the individual cells are able to be plugged. The individual contact rails are connected to one another mechanically, so as thus to provide the mounting support. The mounting support generally includes an outer contact which is electrically connected to the respective metal rail and is used as a clamp connection for the accumulator. Besides the mechanical fastening shown using mounting supports and/or a spring contact, the individual cells may also be connected using an additional adhesive connection to the mounting support of the accumulator. The connection between mounting support and cell is particularly provided via the edge section of the frame, the frame, for one thing encompassing the anode structure, and for another thing, separating the two solid electrolyte structures of the two sides. The frame further completely encloses particularly all the lithium metal, so that elemental lithium within the lithium cell is completely surrounded by the interior end faces of the frame as well as by the surfaces of the solid electrolyte structures which face the anode structures. That being the case, because of the electrically insulating solid electrolyte structure, the lithium is completely insulated from the mixed conductor (i.e. from the carrier material) of the cathode structure, as well as particularly from the active material within the cathode structure. In addition, the frame provides a lateral separation for the end faces of the anode structure, so that there is also no possibility that elemental lithium comes into connection with the electrically conductive cathode structure or especially with the active material. Finally, the solid electrolyte structures of the two cell parts, as well as the frames, completely encapsulate the lithium and thus avoid its contact to the environment, so that the danger of an explosion is basically forestalled.

What is claimed is:

1. A lithium cell, comprising:
 a cathode structure made of a freeze cast base material which conducts electrons and Li ions, the cathode structure including a continuous substrate, which provides a base area, starting from which extends a plurality of crosspieces which provide crosspiece surfaces, starting from which carrier structures extend, which provide carrier surfaces on which active material is distributed.

2. The lithium cell as recited in claim 1, wherein the base area, the crosspieces and the carrier structures are directly connected to one another in continuous material fashion and the carrier structures of adjacent crosspieces are arranged opposite to each other, but are not connected directly to each other, and the substrate includes an electrical contact which provides a cathode connection of the lithium cell.

3. The lithium cell as recited in claim 1, wherein the substrate is developed together with the crosspieces using freeze casting of the base material and the carrier structures are provided by one of nanostructures or nanowires deposited on the crosspiece surfaces, which are developed of the base material.

4. The lithium cell as recited in claim 1, further comprising:
a solid electrolyte structure made of an electrically insulating, Li ion conducting material, on which the continuous substrate is situated, wherein a side of the substrate opposite the base area is situated directly on the solid electrolyte structure; and
an anode structure having a lithium layer, on which the solid electrolyte structure is directly situated, the solid electrolyte structure being directly situated on a front side and a rear side of the anode structure, the crosspieces extending away from the substrate on both sides of the anode structure.

5. The lithium cell as recited in claim 1, wherein the base material has an electrode potential with respect to lithium of one of at most 2.9 V or at most 2 V, and includes one of Li—Ti oxide, $Li_{4-x}Mg_xTi_5O_{12}$, where $0 \leq x \leq 2$ or $0 \leq x \leq 1$, $Li_{4-x}Mg_xTi_{5-y}(Nb, Ta)_yO_{12}$, where $0 \leq x \leq 2$ or $0 \leq x \leq 1$ and $0 \leq y \leq 0.1$ or $0 \leq y \leq 0.05$, or $Li_{2-x}Mg_xTi_{3-y}(Nb, Ta)_yO_7$ where $0 \leq x \leq 1$ or $0 < x < 0.5$ and $0 < y < 0.03$, and wherein the active material includes at least one of sulfur, sulfur particles, catalyst material arranged to support Li—O reactions, $\alpha$-$MnO_2$ or nanocrystalline $\alpha$-MnO.

6. A lithium accumulator, comprising:
a plurality of lithium cells, each of the lithium cells including a cathode structure made of a freeze cast base material which conducts electrons and Li ions, the cathode structure including a continuous substrate, which provides a base area, starting from which extends a plurality of crosspieces which provide crosspiece surfaces, starting from which carrier structures extend, which provide carrier surfaces on which active material is distributed; and
a mounting support in which the plurality of lithium cells are situated in the form of a stack, the mounting support also including electrical contacts by which the lithium cells are electrically connected to one another, the electrical contacts including plug contacts.

7. A method for producing a lithium cell, comprising:
providing a cathode structure by freeze casting a base material which conducts electrons and Li ions, wherein a continuous substrate which provides a continuous base area and a plurality of crosspieces which extend from the base area, are produced using the same freeze casting step;
providing carrier structures after the substrate and the plurality of crosspieces have been produced, the carrier structures extending starting from the crosspieces, by depositing the base material in the form of one of microstructures or nanostructures; and
applying active material in a distributed manner onto carrier surfaces, which are provided by the carrier structures produced.

8. The method as recited in claim 7, further comprising:
providing a solid electrolyte structure made of an electrically insulating, Li ion conducting material, wherein the cathode structure is applied directly onto the solid electrolyte structure by freeze casting the base material onto the solid electrolyte structure which is used in the step of the freeze casting as a casting substrate.

9. The method as recited in claim 8, further comprising:
providing an anode structure, and situating the anode structure on one side of the solid electrolyte layer which is opposite to a side of the cathode structure on which the cathode structure is applied, wherein the anode structure is provided by one of: providing a lithium layer which is embodied in two sublayers between which an electrode layer is situated, the two sublayers being connected to the intermediate electrode layer, by providing a metal foam layer which is interspersed with lithium; or by developing an interspace between two solid electrolyte structures situated towards each other and inserting lithium into the interspace before the cathode structures are applied onto the respective solid electrolyte structures, the inserting of lithium into the interspace being carried out by one of electrochemical pumping of lithium into the interspace or casting the lithium into the interspace.

10. A method for producing a lithium accumulator, comprising:
producing a lithium cell including providing a cathode structure by freeze casting a base material which conducts electrons and Li ions, wherein a continuous substrate which provides a continuous base area and a plurality of crosspieces which extend from the base area, are produced using the same freeze casting step, providing carrier structures after the substrate and the plurality of crosspieces have been produced, the carrier structures extending starting from the crosspieces, by depositing the base material in the form of one of microstructures or nanostructures, and applying active material in a distributed manner onto carrier surfaces, which are provided by the carrier structures produced, situating an electrical contact, which forms a cathode electrode of the lithium cell, in electrical connection to the substrate, at a lateral edge of the substrate, and situating an additional electrical contact, which forms an anode electrode of the lithium cell, on the lithium cell, at an additional lateral edge of the substrate; and
situating a plurality of lithium cells in the form of a stack in a mounting support, in which electrical contacts are provided, by plugging the lithium cells into the electrical contacts of the mounting support, the cathode electrode and the anode electrode becoming electrically connected to the electrical contacts of the mounting support.

* * * * *